(12) United States Patent
Griffin et al.

(10) Patent No.: US 9,384,339 B2
(45) Date of Patent: Jul. 5, 2016

(54) AUTHENTICATING CLOUD COMPUTING ENABLING SECURE SERVICES

(71) Applicants: John L. Griffin, Brookline, MA (US); Keith A. McFarland, Annapolis, MD (US); William P. Wells, Federal Way, WA (US)

(72) Inventors: John L. Griffin, Brookline, MA (US); Keith A. McFarland, Annapolis, MD (US); William P. Wells, Federal Way, WA (US)

(73) Assignee: Telecommunication Systems, Inc., Annapolis, MD (US)

(*) Notice: Subject to any disclaimer, the term of this patent is extended or adjusted under 35 U.S.C. 154(b) by 0 days.

(21) Appl. No.: 13/736,557

(22) Filed: Jan. 8, 2013

(65) Prior Publication Data

US 2013/0269020 A1    Oct. 10, 2013

Related U.S. Application Data

(60) Provisional application No. 61/586,467, filed on Jan. 13, 2012.

(51) Int. Cl.
*G06F 21/34* (2013.01)
*G06F 21/33* (2013.01)
(Continued)

(52) U.S. Cl.
CPC ............ *G06F 21/34* (2013.01); *G06F 21/33* (2013.01); *G06F 21/629* (2013.01); *H04L 63/0807* (2013.01); *H04L 63/0884* (2013.01);
(Continued)

(58) Field of Classification Search
CPC ......... G06F 21/00; G06F 21/34; G06F 21/33; G06F 21/629; G06F 2221/2115; H04L 63/00; H04L 9/00; H04L 9/3228; H04L 63/0807; H04L 9/3213; H04L 63/0884
USPC ............................................................ 726/9
See application file for complete search history.

(56) References Cited

U.S. PATENT DOCUMENTS

| 1,103,073 A | 7/1914 | O'Connell |
| 4,494,119 A | 1/1985 | Wimbush |
| 4,651,156 A | 3/1987 | Martinez |

(Continued)

FOREIGN PATENT DOCUMENTS

| KR | WO/2006/075856 | 7/2006 |
| WO | PCT/SE98/01887 | 10/1998 |

(Continued)

OTHER PUBLICATIONS

International Search Report received in PCT/US2013/21199 dated Mar. 26, 2013.

(Continued)

*Primary Examiner* — Chau Le
*Assistant Examiner* — Muhammad Chaudhry
(74) *Attorney, Agent, or Firm* — Tarolli, Sundheim, Covell & Tummino LLP

(57) ABSTRACT

Authenticating cloud computing enabling secure services (ACCESS) offloads "client authentication" activity onto a third-party authenticating cloud computing enabling secure services (ACCESS) node. Instead of having a client device authenticate itself directly to a network server, the client device instead authenticates itself to a third-party authenticating cloud computing enabling secure services (ACCESS) node. The authenticating cloud computing enabling secure services (ACCESS) node then provides credentials that are used by the client device to communicate directly with the server (and utilize the service) without any further authentication being necessary.

2 Claims, 7 Drawing Sheets

(51) Int. Cl.
*G06F 21/62* (2013.01)
*H04L 29/06* (2006.01)

(52) U.S. Cl.
CPC ..... *G06F2221/2115* (2013.01); *H04L 63/0815* (2013.01); *H04L 63/0892* (2013.01)

(56) References Cited

U.S. PATENT DOCUMENTS

| | | |
|---|---|---|
| 4,706,275 A | 11/1987 | Kamil |
| 4,891,638 A | 1/1990 | Davis |
| 4,891,650 A | 1/1990 | Scheffer |
| 4,910,767 A | 3/1990 | Brugliera et al. |
| 4,928,107 A | 5/1990 | Kuroda |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,930,701 A | 7/1999 | Skog |
| 5,943,399 A | 8/1999 | Banister |
| 5,945,944 A | 8/1999 | Krasner |
| 5,946,629 A | 8/1999 | Sawyer |

(56) References Cited

U.S. PATENT DOCUMENTS

| | | |
|---|---|---|
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Houtari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,104,931 A | 8/2000 | Havinis |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,028 A | 10/2000 | Whittington |
| 6,131,067 A | 10/2000 | Girerd |
| 6,133,874 A | 10/2000 | Krasner |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotala |
| 6,324,524 B1 | 11/2001 | Lent |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |

(56) References Cited

U.S. PATENT DOCUMENTS

| | | |
|---|---|---|
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockeart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,260,186 B2 | 8/2007 | Zhu |

(56) References Cited

U.S. PATENT DOCUMENTS

| | | |
|---|---|---|
| 7,260,384 B2 | 8/2007 | Bales et al. |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,394,896 B2 | 7/2008 | Norton |
| 7,428,571 B2 | 9/2008 | Ichimura |
| 7,436,785 B1 | 10/2008 | McMullen |
| 7,440,442 B2 | 10/2008 | Grabelsky et al. |
| 7,573,982 B2 | 8/2009 | Breen |
| 7,602,886 B1 | 10/2009 | Beech |
| 7,711,094 B1 | 5/2010 | Olshansky |
| 7,783,297 B2 | 8/2010 | Ishii |
| 2001/0011247 A1 | 8/2001 | O'Flaherty |
| 2001/0040886 A1 | 11/2001 | Jimenez |
| 2001/0049274 A1 | 12/2001 | Degraeve |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0156732 A1 | 10/2002 | Odjik |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0061170 A1* | 3/2003 | Uzo .................. 705/64 |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0096626 A1 | 5/2003 | Sabo et al. |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068665 A1* | 4/2004 | Fox et al. .................. 713/201 |
| 2004/0068724 A1 | 4/2004 | Gardner |
| 2004/0092250 A1 | 5/2004 | Valloppillil |
| 2004/0098497 A1 | 5/2004 | Banet |
| 2004/0132465 A1 | 7/2004 | Mattila |
| 2004/0148357 A1 | 7/2004 | Corrigan et al. |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203922 A1 | 10/2004 | Hines |
| 2004/0205151 A1 | 10/2004 | Sprigg |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0071671 A1 | 3/2005 | Karaoguz |
| 2005/0083911 A1 | 4/2005 | Grabelsky |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0119012 A1 | 6/2005 | Merheb |
| 2005/0120214 A1 | 6/2005 | Yeates |
| 2005/0134504 A1 | 6/2005 | Harwood |
| 2005/0135569 A1 | 6/2005 | Dickinson et al. |
| 2005/0136885 A1 | 6/2005 | Kaltsukis |
| 2005/0149430 A1 | 7/2005 | Williams |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0243778 A1 | 11/2005 | Wang |
| 2005/0250516 A1 | 11/2005 | Shim |
| 2005/0259675 A1 | 11/2005 | Tuohino |
| 2005/0265318 A1 | 12/2005 | Khartabil |
| 2005/0266864 A1 | 12/2005 | Chen et al. |
| 2005/0271029 A1 | 12/2005 | Iffland |
| 2005/0282518 A1 | 12/2005 | D'Evelyn |
| 2005/0287979 A1 | 12/2005 | Rollender |
| 2005/0287990 A1 | 12/2005 | Mononen |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058102 A1 | 3/2006 | Nguyen et al. |
| 2006/0064307 A1 | 3/2006 | Pakkala |
| 2006/0068753 A1 | 3/2006 | Karpen |
| 2006/0079249 A1 | 4/2006 | Shim |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0242230 A1 | 10/2006 | Smith |
| 2006/0258380 A1 | 11/2006 | Liebowitz |

(56) References Cited

U.S. PATENT DOCUMENTS

| | | |
|---|---|---|
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffman |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0049288 A1 | 3/2007 | Lamprecht |
| 2007/0072624 A1 | 3/2007 | Niemaenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0202897 A1 | 8/2007 | Smith |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0270164 A1 | 11/2007 | Maier |
| 2008/0014931 A1 | 1/2008 | Yared |
| 2008/0037715 A1 | 2/2008 | Prozeniuk |
| 2008/0063153 A1 | 3/2008 | Krivorot |
| 2008/0065775 A1 | 3/2008 | Polk |
| 2008/0109650 A1 | 5/2008 | Shim |
| 2008/0117859 A1 | 5/2008 | Shahidi |
| 2008/0186164 A1 | 8/2008 | Emigh |
| 2008/0214202 A1 | 9/2008 | Toomey |
| 2008/0263169 A1 | 10/2008 | Brabec et al. |
| 2009/0137244 A1 | 5/2009 | Zhou et al. |
| 2009/0158136 A1 | 6/2009 | Rossano et al. |
| 2009/0158397 A1 | 6/2009 | Herzog et al. |
| 2009/0172804 A1 | 7/2009 | Spies et al. |
| 2009/0265552 A1 | 10/2009 | Moshir et al. |
| 2009/0265763 A1 | 10/2009 | Davies et al. |
| 2010/0250603 A1* | 9/2010 | Balakrishnaiah et al. .... 707/781 |
| 2010/0287369 A1* | 11/2010 | Monden .......................... 713/156 |
| 2010/0311447 A1 | 12/2010 | Jackson |
| 2011/0053618 A1 | 3/2011 | Lin et al. |
| 2011/0145564 A1 | 6/2011 | Moshir et al. |
| 2011/0252146 A1 | 10/2011 | Santamaria et al. |
| 2011/0307947 A1 | 12/2011 | Kariv |
| 2011/0314533 A1 | 12/2011 | Austin |
| 2012/0124367 A1* | 5/2012 | Ota et al. ....................... 713/153 |
| 2012/0150968 A1 | 6/2012 | Yasrebi et al. |
| 2012/0192287 A1 | 7/2012 | Cai et al. |
| 2012/0198535 A1* | 8/2012 | Oberheide et al. ............... 726/9 |

FOREIGN PATENT DOCUMENTS

| | | |
|---|---|---|
| WO | PCTUS9928848 | 12/1999 |
| WO | WO01/45342 | 6/2001 |
| WO | PCTUS0146666 | 11/2001 |
| WO | WO2004/025941 | 3/2004 |
| WO | PCT/US05/022090 | 6/2005 |
| WO | WO2005/051033 | 6/2005 |
| WO | WO 2010/124739 | 11/2010 |
| WO | WO2011/100331 | 8/2011 |

OTHER PUBLICATIONS

International Search Report received in PCT/US2012/068083 dated Feb. 8, 2013.

International Search Report received in PCT/US2013/21199 dated Dec. 12, 2013.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

International Search Report in PCT/US2007/23243 dated Apr. 2, 2008.

PCT International Search Report (PCTUS2007/23714) and Written Opinion of International Searching Authority, Apr. 18, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Location Based Services V2 Roaming Support (non proprietary), 80-V8470-2NP A, dated Jan. 27, 2005, pp. 1-56.

Qualcomm CDMA Technologies, MS Resident User Plane LBS Roaming—80-VC718-1 E, 2006, pp. 1-37.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

European Search received in EP13735985 dated Oct. 6, 2015.

\* cited by examiner

9,384,339 B2

AUTHENTICATING CLOUD COMPUTING ENABLING SECURE SERVICES

This application claims priority from U.S. Provisional No. 61/586,467, filed Jan. 13, 2012, to John L. Griffin et al., entitled "Authenticating Cloud Computing, Enabling Secure Services," the entirety of which is explicitly incorporated herein by reference.

BACKGROUND OF THE INVENTION

1. Field of the Invention

This invention relates generally to secure communications. More particularly it relates to authentication of a network device.

2. Background of the Related Art

Conventional service and network administration systems control external access to services with an authentication, access control, or gateway device at the edge of an internal network, such that the gateway device resides between the servers that provide a given service, and the clients that utilize that service. As used herein, the term "server" refers generally to one or more computer systems that work individually or cooperatively to provide a service to client devices.

FIG. 7 shows conventional authentication wherein network-level traffic management policy requires inbound traffic to be forced to pass through a gateway device.

In particular, as shown in FIG. 7, an authenticating gateway 700 resides in a given internal network 702, providing a forced bottleneck between one or more clients 704 and one or more services 710, 712. All external network traffic must pass through the authenticating gateway 700. The authenticating gateway 700 enforces security policy.

By forcing all traffic through the authenticating gateway 700, all security functions are performed by the authenticating gateway 700 (such as authentication, access control, and admission control). Doing so has a great advantage in that these functions do not then have to be included as part of the services 710, 712. Rather, only the authenticating gateway device 700 need be accounted for as part of the overall service architecture.

A core observation by the present inventors is that servers in the cloud are typically geographically or topographically decentralized. As a result, the use of an inline gateway device for security has several significant flaws for modern services in a cloud environment: (1) Lack of Scalability. All traffic to and from a service's servers must be routed through the gateway device, to ensure that the gateway device provides its security function. (2) Server co-location. Servers must be placed close (spatially and/or topographically) to the gateway device, for the gateway-to-server link not to add significant latency to service response times. (3) Inflexible Architecture. Clients must communicate with the gateway device, not with the actual servers.

Cloud computing addresses these flaws by allowing servers (and therefore services) to run with spatial and computational independence. Unfortunately, in doing so the ability to control the flow of traffic between a client and a server is lost; in particular network-level traffic routing rules can no longer be used to achieve the desired security architecture.

SUMMARY OF THE INVENTION

In accordance with the principles of the present invention, a method and apparatus for authenticating a cloud-based secure service comprises receiving a key from a service server. Credentials are received from a client device. An authentication token is passed to the client device when the credentials from the client device are pre-authorized, whereby the client device is enabled to access a service from the service server using the authentication token.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
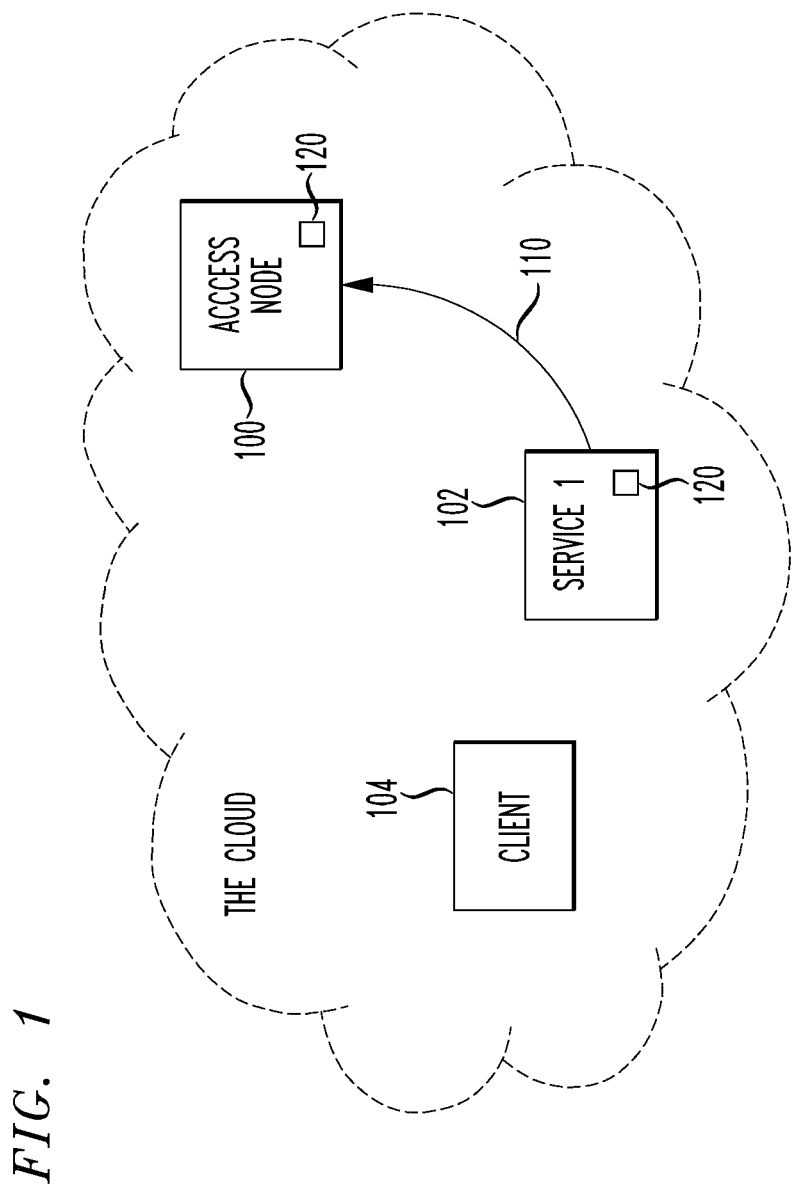
FIG. 1 shows a first exemplary step of service registration, for authenticating cloud computing enabling secure services (ACCESS), in accordance with the principles of the present invention.

The present inventors have appreciated that a conventional authenticating gateway device becomes a bottleneck as the number of services (protected by the gateway) or the amount of traffic (through the gateway) scale upwards, particularly in a cloud environment. The inventors hereof have also recognized that server co-location, particularly in a cloud environment, reduces the opportunity to geographically distribute servers for resiliency and performance. Moreover, the inventors hereof have realized that unless gateway devices are widely replicated in a cloud environment, there will seldom be a short-distance path between the client and the gateway, and the increased path length adds latency to the services provided.

The present invention enables authentication of a network device using a network service as part of an access control or admission control strategy. Conventional approaches toward mandating service security in a cloud computing environment build security activities such as authentication into the service itself. But the present inventors have appreciated that this approach is undesirable because uniform development or deployment of security activities can no longer be ensured. Rather, the inventors hereof have realized that in a cloud computing (or similar distributed computing) environment, better security mechanisms (such as authentication, access control, and admission control) are needed to work well in geographically-independent and computationally-independent environments such as the cloud.

The present invention conveys security information in a distributed (or "cloud") computing environment utilizing what is referred to herein as: authenticating cloud computing enabling secure services (ACCESS). A central tenet of authenticating cloud computing enabling secure services (ACCESS) is that a network service is enabled to offload its "client authentication" activity onto a third-party authenticating cloud computing enabling secure services (ACCESS) node. Instead of having a client authenticate itself directly to a server, the client instead authenticates itself to a third-party authenticating cloud computing enabling secure services (ACCESS) node. The authenticating cloud computing enabling secure services (ACCESS) node then provides credentials that are used by the client to communicate directly with the server (and utilize the service) without any further authentication being necessary. This separation of authentication activity from the remainder of the cloud-provided service is a specific adaptation of the present invention to the operating characteristics of a cloud environment.

The term "service administrator" as used herein generally refers to the service provider or service designer; i.e., the entity device responsible for a given service.

To begin use of authenticating cloud computing enabling secure services (ACCESS), a given service administrator first provides an ACCESS node with a list of descriptive items regarding specific security aspects to enforce. For instance, exemplary descriptive items regarding specific security aspects to enforce may include: (a) a set of secret cryptographic keys and/or certificates for use in communication and in signing authentication messages; (b) a list of users, roles, and principals; (c) sets of objects or resources to be utilized and protected by the authenticating cloud computing enabling secure services (ACCESS) protocol; and/or (d) machine-enforceable policies governing when and how the principals can utilize the resources.

FIG. 1 shows a first exemplary step of service registration, for authenticating cloud computing enabling secure services (ACCESS), in accordance with the principles of the present invention.

In particular, as shown in FIG. 1, a service server 102 provides an authenticating cloud computing enabling secure services (ACCESS) node 100 with a registration message 110 containing an authentication policy (or policies), and other appropriate information. An exemplary initial transaction between the service administrator 102 and the authenticating cloud computing enabling secure services (ACCESS) node 100 is subject to special security protections. These precautions are needed to prevent a malicious party from bypassing the authenticating cloud computing enabling secure services (ACCESS) protocol or providing invalid configuration information to the authenticating cloud computing enabling secure services (ACCESS) node 100.

In the example of FIG. 1, it is assumed that prior to the disclosed step, e.g., perhaps at the time that the service administrator 102 contracted or paid to use authenticating cloud computing enabling secure services (ACCESS)—the service server 102 and the authenticating cloud computing enabling secure services (ACCESS) node 100 exchanged cryptographic keys 120. All further communications between the service's server(s) 102 and the authenticating cloud computing enabling secure services (ACCESS) node 100 are encrypted using the shared secret represented by those cryptographic keys 120. As a result, knowledge of these cryptographic keys 120 is used as an authenticity and integrity verification over direct communications between the service server 102 and the authenticating cloud computing enabling secure services (ACCESS) node 100.

In addition, during the step shown and described with reference to FIG. 1, the service server(s) or service administrator 102 specifies in registration message 110 which of the optional service notification methods to use after a client device 104 authenticates (e.g., with a push notification or pull notification.)

Only a single authenticating cloud computing enabling secure services (ACCESS) node 100 is shown in FIG. 1. However, the authenticating cloud computing enabling secure services (ACCESS) service itself may be provided by a single node 100 or by multiple distributed nodes operating in federation. Also, the service administrator 102 may also simultaneously use multiple competing ACCESS-style security offerings, each operated independently, for clients 104 or service servers 102 to be able to choose among authentication providers. The inventors recognize that the authenticating cloud computing enabling secure services (ACCESS) system may support multiple communication protocols. The exemplary structures provided herewith in this invention may be embedded within a variety of communication protocols either defined by standards or developed for proprietary purposes.

An exemplary structure of a registration message 110 (occurring over an encrypted transport) is as follows:
  Unique service instance identifier;
  Service identifier status (e.g., online, offline, suspend); and
  Optional notification method (e.g., push, pull, default, none).
  Notification method format may be:
  Unforgeable token (same format as provided to client);
  Subset notification (specific parameters are identified which the service requests explicit notification on for all signed tokens.)

Depending upon the specific encryption methodology used, the shared cryptographic key(s) 120 are exchanged out-of-band or in-band between the service server 102 and the authenticating cloud computing enabling secure services (ACCESS) node(s) 100 prior to the step shown and described with reference to FIG. 1. The authenticating cloud computing enabling secure services (ACCESS) node 100 preferably supports multiple encryption methods, and more than one encryption method may be employed simultaneously by the authenticating cloud computing enabling secure services (ACCESS) node 100 for use in communications with multiple service servers 102 (and multiple services).

Figure 2:
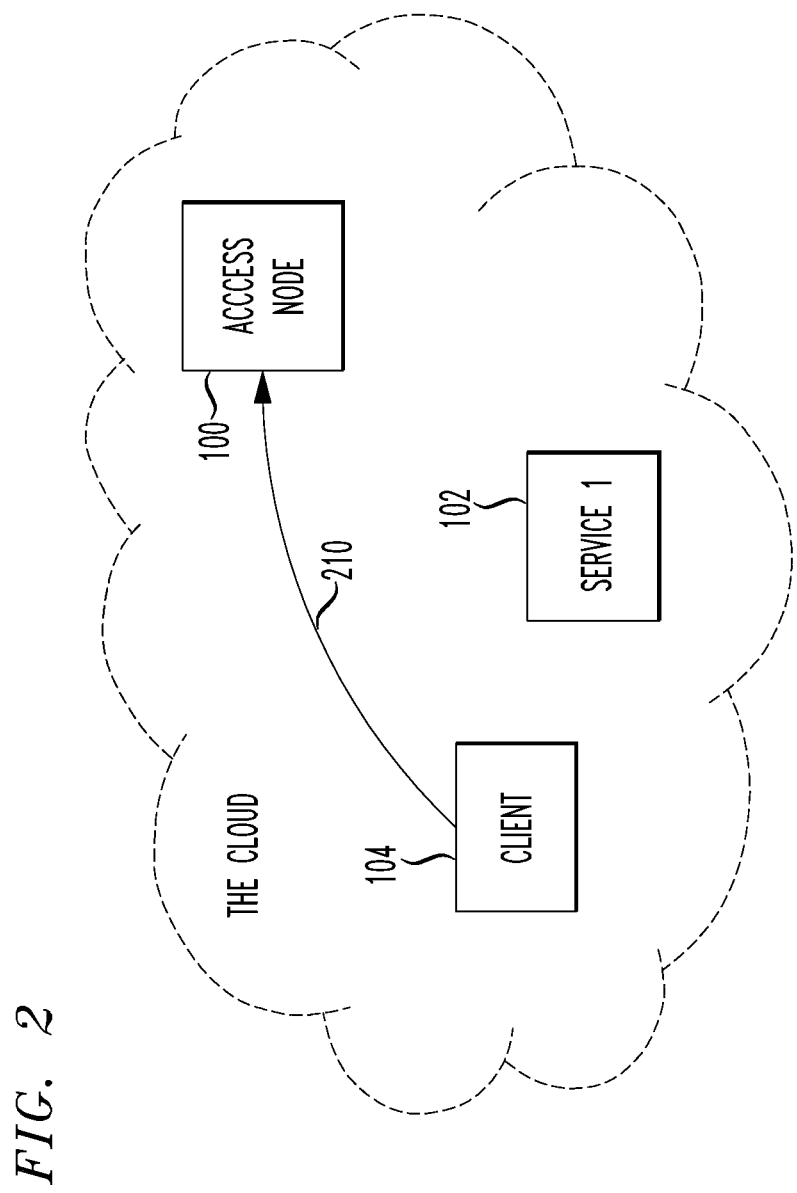
FIG. 2 shows a second exemplary step of client access request, for authenticating cloud computing enabling secure services (ACCESS), in accordance with the principles of the present invention.

FIG. 2 shows a second exemplary step of client access request, for authenticating cloud computing enabling secure services (ACCESS), in accordance with the principles of the present invention.

In particular, as shown in FIG. 2, when a given client 104 desires to utilize a given service 102, the client 104 is directed first to contact the access node 100 to authenticate or otherwise request service from the service 102.

To do so, the client 104 provides the authenticating cloud computing enabling secure services (ACCESS) node 100 with a set of key-value pairs containing preferably all of the credentials 210 for the client 104 that are required for the client 104 to use the service 102.

The credentials 210 for the client 104 necessary for client 104 to utilize a given service 102 may include, e.g., passwords, biometric data about an authorized user of the client 104, or the user's device, location information including current and previous locations and direction of travel, historical documentation regarding previous successful authentications by the client 104, use of the service 102 (or of other related services), and/or output from seeded pseudorandom number generators in possession of the client 104, among others. These credentials 210 may be provided by the client device 104, software residing thereon, or by direct input from a user of the client device 104.

All communications between the client 104 and the authenticating cloud computing enabling secure services (ACCESS) node 100 may involve encrypted transport.

FIG. 2 shows a single message being exchanged from the client 104 to the authenticating cloud computing enabling secure services (ACCESS) node 100. However, multiple messages may be sent between the client 104 and the authenticating cloud computing enabling secure services (ACCESS) node 100. For example, the client 104 may provide a minimum set of credentials 210; the authenticating cloud computing enabling secure services (ACCESS) node 100 may reject those credentials 210 as not satisfying its requirements; and the client 104 could then resubmit a broader set of credentials 210 in the hopes of gaining authentication to utilize the service 102.

Optionally, the authenticating cloud computing enabling secure services (ACCESS) node 100 may first provide a list of required minimum authentication keys. For example, the authenticating cloud computing enabling secure services (ACCESS) node 100 may convey to the client 104 that it will accept either (1) a set of key-value pairs containing two passwords; or (2) a set of key-value pairs containing one password and one piece of biometric information. In this case, the client 104 may either send all of its authentication information as credentials 210 in this step shown and described with respect to FIG. 1, or only its choice of the minimum information to satisfy authentication requirements conveyed by the authenticating cloud computing enabling secure services (ACCESS) node 100.

Figure 3:
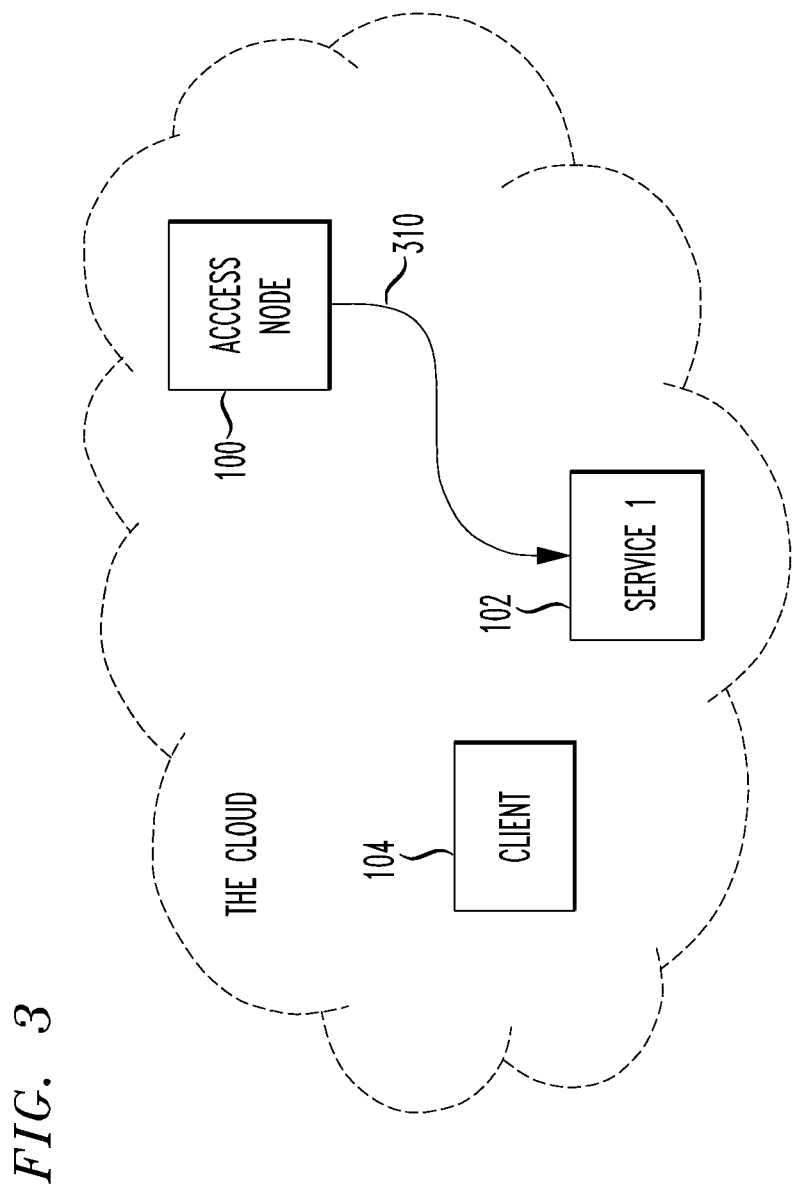
FIG. 3 shows an exemplary optional third step of a push notification, for authenticating cloud computing enabling secure services (ACCESS), in accordance with the principles of the present invention.

FIG. 3 shows an exemplary optional third step of a push notification, for authenticating cloud computing enabling secure services (ACCESS), in accordance with the principles of the present invention.

In particular, as shown in the optional step of FIG. 3, the authenticating cloud computing enabling secure services (ACCESS) node 100 may notify the service server(s) 102 directly of the results of the authentication exchange using push message 310. Push message 310 is encrypted using the shared or calculated asymmetric cryptographic keys 120 in order to provide authenticity and integrity verification over direct communications between the service server 102 and the authenticating cloud computing enabling secure services (ACCESS) node 100.

Such a "push" message, if requested by the service administrator in the step shown in FIG. 1, informs the service server(s) 102 of the identity of each authenticated client 104. This information may be used by the service server(s) 102 as part of a load balancing, data or result prefetching, or other performance-optimization strategy. "Push or Pull Notifications" are discussed further herein with respect to FIG. 6.

Figure 4:
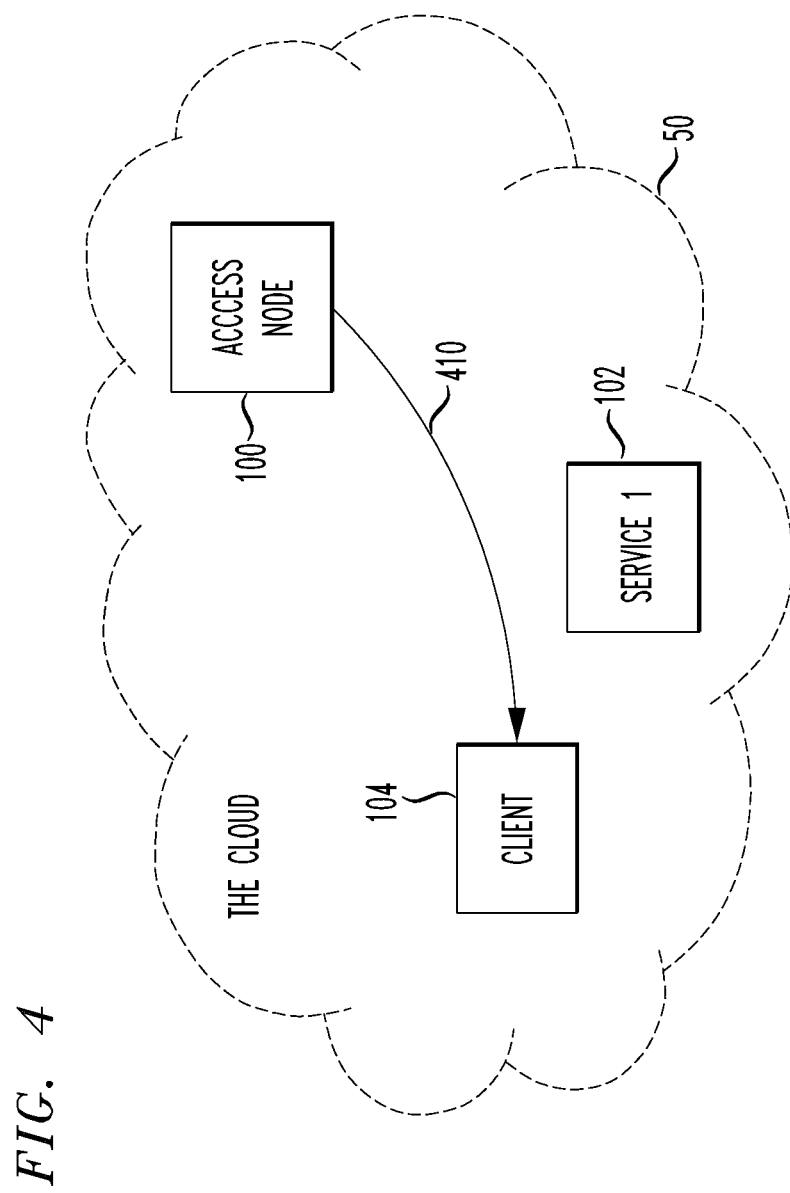
FIG. 4 shows an exemplary fourth step of token authorization to client, for authenticating cloud computing enabling secure services (ACCESS), in accordance with the principles of the present invention.

FIG. 4 shows an exemplary fourth step of token authorization to client, for authenticating cloud computing enabling secure services (ACCESS), in accordance with the principles of the present invention.

In particular, as shown in FIG. 4, if the user device client 104 is authenticated, the authenticating cloud computing enabling secure services (ACCESS) node 100 generates an unforgeable authentication token 410 (signed capability) and provides it to the client 104. While the authentication token 410 itself is typically provided to the client 104 in encrypted format, the structure of this authentication token 410 is a set of one or more key-value pairs, plus a hash value. The key-value pairs may include information representing the result of the authentication activity, including:

Client identity (as observable by the server);
Server identity or identities (as requested by the client);
Values or summary of authentication credentials provided by the client;
Timestamps, including token creation time and length of token validity;
Nonce (to prevent token reuse);
Token type (single-use/valid-until-used, multiple-use);
Token exclusivity (whether the token may be used simultaneously with other tokens);
Server exclusivity (whether the token may be used simultaneously on multiple client requests);
Privileges granted (at client's level of authentication);
Quality of Service (or QoS) granted (at client's level of authentication); and/or
Custom key-value pairs (defined by the service administrator in step #1).

The hash value represents a signature over all key-value pairs, using the shared secret information conveyed in the step of FIG. 1, following best practices for message integrity using secret-key or public-key cryptography. The authentication token 410 is "unforgeable" because it is protected using this information known only to the authenticating cloud computing enabling secure services (ACCESS) node 100 and to the service server(s) 102.

The key-value contents of the authentication token 410 itself may or may not be encrypted (using keys shared in the step of FIG. 1) depending on the configuration instructions of the service administrator in the step of FIG. 1.

In the step of FIG. 2, the client 104 is shown as contacting the authenticating cloud computing enabling secure services (ACCESS) node 100 directly. In such a case the reply from the authenticating cloud computing enabling secure services (ACCESS) node 100 in the step of FIG. 4 would include a redirect providing information on what the client 104 should do next, for example specifying which service provider 102 in the cloud 50 is best suited for the geographic or network-topographic location of the client 104. In an alternate implementation, the client 104 contacts a service server 102 directly, but (since the client 104 is not presenting an authentication token 410) the service server 102 using the communication protocol specific redirect message immediately redirects the client 104 to the authenticating cloud computing enabling secure services (ACCESS) node 100 for authentication. Conceptually both implementations are similar to how DNS redirection is currently used in web caching infrastructures. Additionally, an unseen network element may intercept an attempted unauthorized communication initiated by the client 104 going to the service server 102. If the client's 104 unauthorized communication attempt is intercepted it may be redirected by this unseen network element to the authenticating cloud computing enabling secure services (ACCESS) node 100 for authentication.

The authentication tokens 410 as provided by the authenticating cloud computing enabling secure services (ACCESS) node 100 provide authorization control based upon three categories: Token format, access control, and user restrictions.

Token Format:

During the authenticating cloud computing enabling secure services (ACCESS) node provisioning shown in the step of FIG. 1, the service administrator of the service server 102 specifies what sort(s) of authentication token(s) should be created by the authenticating cloud computing enabling secure services (ACCESS) node 100 (given a set of principles and objects that it has authenticated under a policy), or simply states that the authenticating cloud computing enabling secure services (ACCESS) node 100 may use a default format to convey the authentication token 410.

Access Controls:

Depending on the service environment, this authentication token 410 may either grant full access to the client device 104 service 102, or it may provide fine-grained access control ("capabilities") for what actions the client 104 is permitted to take and what resources the client device 104 is permitted to consume. In the strictest sense, access controls limit what capabilities of the service (and of the service's servers 102) the client user device 104 may consume. Therefore, access controls are configured per service offering.

User Restrictions:

In situations where the service environment dictates, the authentication tokens 410 may specify user restrictions. User restrictions are independent of the capabilities of the service 102 offered but may result in the same consequences as access controls. For example, the authentication token 410 may be time-limited (expiring after a set time), geography limited (expiring if a client 104 departs a geographical region), or it may be revocable by the authenticating cloud computing enabling secure services (ACCESS) node 100 on demand or when the client 104 requests access to another service 102.

Figure 5:
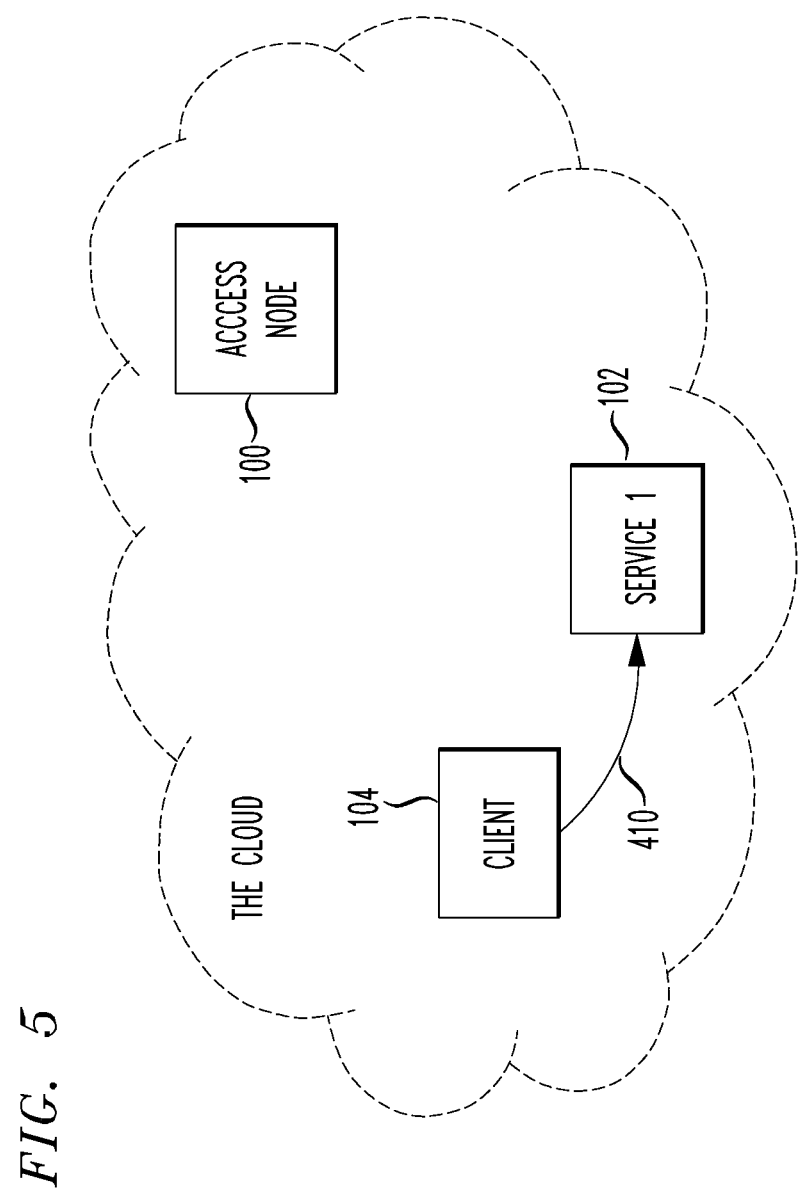
FIG. 5 shows an exemplary fifth step of a service request, for authenticating cloud computing enabling secure services (ACCESS), in accordance with the principles of the present invention.

FIG. 5 shows an exemplary fifth step of a service request, for authenticating cloud computing enabling secure services (ACCESS), in accordance with the principles of the present invention.

In particular, as shown in FIG. 5, finally, the client 104 directly contacts the service server 102 and sends the authentication token 410 to the service server 102. The client 104 uses the authentication token 410 to obtain service directly from the service server 102.

All the service server 102 has to do is check the validity of the authentication token 410 presented before it accepts the client requests (in this case by verifying the hashed signature included in the authentication token 410 matches what the service server 102 expects given the secret cryptographic keys 120 the service server 102 shared with the authenticating cloud computing enabling secure services (ACCESS) node 100), optionally check the identity of the client 104 against any messages received from the authenticating cloud computing enabling secure services (ACCESS) node 100 in the optional step of FIG. 3, parse the access authentication token 410 to determine which resources to provide to the client 104, and use the authentication token 410 to determine with what quality of service to provide those resources. The service server 102 then begins to perform work on behalf of the client 104.

No further interaction is required between the client 104 and the authenticating cloud computing enabling secure services (ACCESS) node 100, unless the client 104 later needs to expand its privileges or permissions by repeating the authentication process using a broader set of credentials 210.

Figure 6:
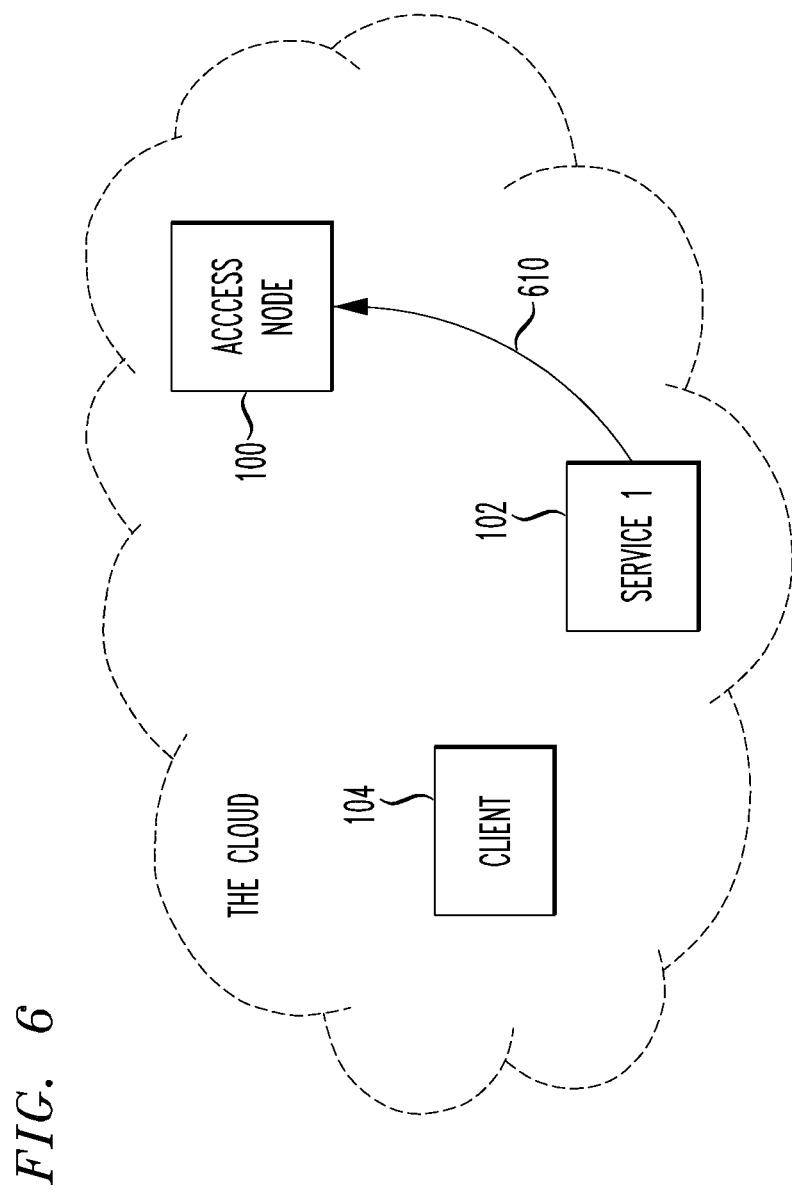
FIG. 6 shows an exemplary optional sixth step of a pull notification, of authenticating cloud computing enabling secure services (ACCESS), in accordance with the principles of the present invention.
Figure 7:
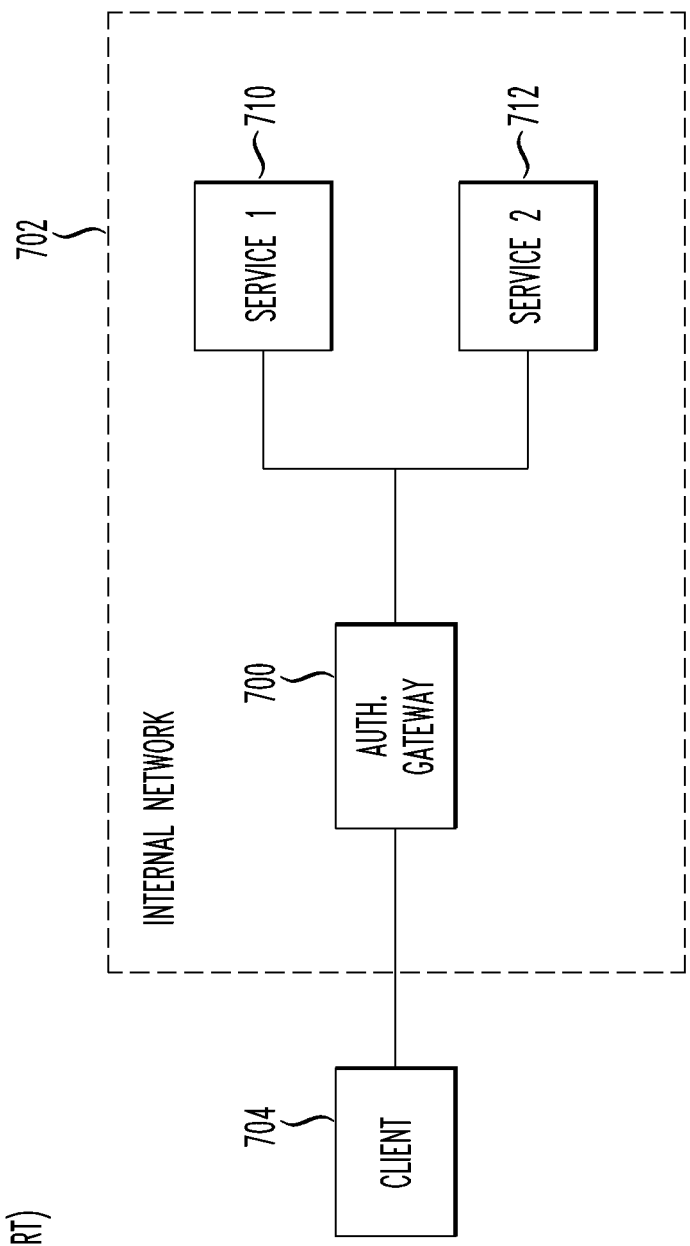
FIG. 7 shows conventional authentication wherein network-level traffic management policy requires inbound traffic to be forced to pass through a gateway device.

FIG. 6 shows an exemplary optional sixth step of a pull notification, of authenticating cloud computing enabling secure services (ACCESS), in accordance with the principles of the present invention.

In particular, as shown in FIG. 6, in an optional step, the service server 102 may contact the authenticating cloud computing enabling secure services (ACCESS) node 100 to verify the validity of the authentication token 410 or to obtain additional information about the authentication inputs and authentication decision.

The structure of the "push" or "pull" notification is based upon the information provided by the service server or service administrator 102 shown with respect to the step of service registration shown in FIG. 1. This structure remains valid until the service server 102 notifies the authenticating cloud computing enabling secure services (ACCESS) node 100 otherwise. These notifications may include any of the following information, in the form of explicitly declared key-value pairs:

Client identity (as observable by the server);
Server identity or identities (as requested by the client);
Values or summary of authentication credentials provided by the client;
Timestamps, including token creation time and length of token validity;
Nonce (to prevent token reuse);
Token type (single-use/valid-until-used, multiple-use);
Token exclusivity (whether the token may be used simultaneously with other tokens);
Server exclusivity (whether the token may be used simultaneously on multiple client requests);
Privileges granted (at client's level of authentication);
Quality of Service granted (at client's level of authentication); and/or
Custom key-value pairs (defined by the service administrator in the step show in FIG. 1.)

When either a "pull" or "push" step is selected by the service administrator of the service server 102, the authentication token 410 provided to the client 104 in FIG. 4 may contain only a subset of the key-value pairs 110. The authentication token 410 also may not contain the same hash values and protection schemes. Protection over the authentication transaction itself stems from the shared secret between the service's servers 102 and the authenticating cloud computing enabling secure services (ACCESS) node 100 as established in the step shown in FIG. 1.

The optional step of a pull notification shown and described with respect to FIG. 6 may or may not be used in conjunction with the optional additional step of a push notification shown and described with respect to FIG. 3. The step of pull notification may be mutually exclusive to the step of a push notification.

The disclosed architecture of authenticating cloud computing enabling secure services in accordance with the principles of the present invention provides security functions such as authentication, access control, and admission control. The use of ACCESS architecture also addresses the conventional problems of lack of scalability, server colocation, and inflexible architecture. The service's servers 102 may reside anywhere in the given cloud 50, as may the authenticating cloud computing enabling secure services (ACCESS) node(s) 100, without reducing either the performance of the client-server link or reducing the security functions achieved.

The invention has particular applicability to the mobile handheld market (both for cellular telephones and other personal mobile devices), especially with respect to these devices communicating directly with end services and bypassing the cellular telecommunications networks. It also has applicability to the general-purpose computing market, both for consumer/business workstations accessing cloud services & for server systems that in turn use backend services provided in the cloud.

The authenticating cloud computing enabling secure services method and architecture of the present invention may be implemented such that the highest point-to-point performance between a given client and a given cloud-enabled service may be achieved. The invention has applicability to both end-client application developers (who might include ACCESS technologies in their applications or products) as well as any company that "resells" authentication as a third-party service, e.g., to such application developers.

U.S. application Ser. No. 13/506,418, entitled "Usage Authentication via Intercept and Challenge For Network Services", filed Apr. 18, 2012, to McFarland et al., and having common Assignment to the present application, has applicability to the present invention, and is incorporated herein by reference.

While the invention has been described with reference to the exemplary embodiments thereof, those skilled in the art will be able to make various modifications to the described embodiments of the invention without departing from the true spirit and scope of the invention.

What is claimed is:

1. A method of pre-authenticating a client device for direct access to a cloud-based secure service, comprising:
    receiving a request for pre-authorization from a client device, at an access node separate from a cloud-based secure service server;
    receiving credentials from said client device, at said access node separate from said cloud-based secure service server, said credentials comprising a registration message encrypted using a shared secret cryptographic key;
    passing a pre-authorized authentication token together with a redirect to said client device, said pre-authorized authentication token for provision by said client device directly to said cloud-based secure service server without passage through said access node;
    providing a push or pull notification, when authenticated, from said access node to said cloud-based secure service server, said notification identifying said client device;
    receiving a request at said access node, from said cloud-based secure service server, to verify validity of said pre-authorized authentication token received by said cloud-based secure service server from said client device; and
    receiving a request from said cloud-based secure service server for additional information regarding authentication of said client device to access a cloud-based secure service on said cloud-based secure service server;
    whereby said client device directly provides its own authorization token directly to said cloud-based secure service server bypassing said access node to directly access said cloud-based secure service server.

2. Apparatus to pre-authenticate a client device for direct access to a cloud-based secure service, comprising:
    means for receiving a request for pre-authorization from a client device, at an access node separate from a cloud-based secure service server;
    means for receiving credentials from said client device, at said access node separate from said cloud-based secure service server, said means for receiving credentials receives a registration message encrypted using a shared secret cryptographic key;
    means for passing a pre-authorized authentication token together with a redirect to said client device, said pre-authorized authentication token for provision by said client device directly to said cloud-based secure service server without passage through said access node;
    means for providing a push or pull notification, when authenticated, from said access node to said cloud-based secure service server, said notification identifying said client device;
    means for receiving a request at said access node, from said cloud-based secure service server, to verify validity of said pre-authorized authentication token received by said cloud-based secure service server from said client device; and
    means for receiving a request from said cloud-based secure service server for additional information regarding authentication of said client device to access a cloud-based secure service on said cloud-based secure service server;
    whereby said client device is enabled to directly provide its own authorization token directly to said cloud-based secure service server, bypassing said access node, to directly access said cloud-based secure service server.

* * * * *